United States Patent [19]
Hammond, Jr. et al.

[11] Patent Number: 5,294,783
[45] Date of Patent: Mar. 15, 1994

[54] ANALOG RECONSTRUCTION CIRCUIT AND BAR CODE READING APPARATUS EMPLOYING SAME

[75] Inventors: Charles M. Hammond, Jr.; Andrew Longacre, Jr.; William H. Havens, all of Skaneateles, N.Y.

[73] Assignee: Welch Allyn, Inc., Skaneateles Falls, N.Y.

[21] Appl. No.: 819,448

[22] Filed: Jan. 10, 1992

[51] Int. Cl.$^5$ ............................................. G06K 7/10
[52] U.S. Cl. .................................... 235/462; 435/463
[58] Field of Search ....................... 235/462, 463, 472

[56]  References Cited
  U.S. PATENT DOCUMENTS

| | | | |
|---|---|---|---|
| 3,892,950 | 7/1975 | Dodson, III | 235/462 |
| 3,909,594 | 9/1975 | Allais | 235/462 |
| 4,096,992 | 6/1978 | Nojiri et al. | 235/462 |
| 4,335,301 | 6/1982 | Palmer et al. | 235/462 |
| 4,682,015 | 7/1987 | Ouan | 235/472 |
| 4,833,309 | 5/1989 | Yomogida | 235/462 |

FOREIGN PATENT DOCUMENTS

| | | | |
|---|---|---|---|
| 2565746 | 12/1985 | France . | |
| 2635207 | 2/1990 | France . | |
| 219381 | 9/1991 | Japan | 235/462 |

*Primary Examiner*—John Shepperd
*Attorney, Agent, or Firm*—Harris Beach & Wilcox

[57] ABSTRACT

A bar code detection circuit accepts as input the discretized analog output of a CCD array, and performs piecewise linear reconstruction to produces a continuous polylinear output signal. In the region of a bar/space transition, the output signal is a close approximation of the reflectance function of a bar code symbol convolved with the system transfer function of the bar code reader. Linear interpolation is performed in order to determine the offset of a given threshold value from an edge of the CCD analog output.

11 Claims, 5 Drawing Sheets

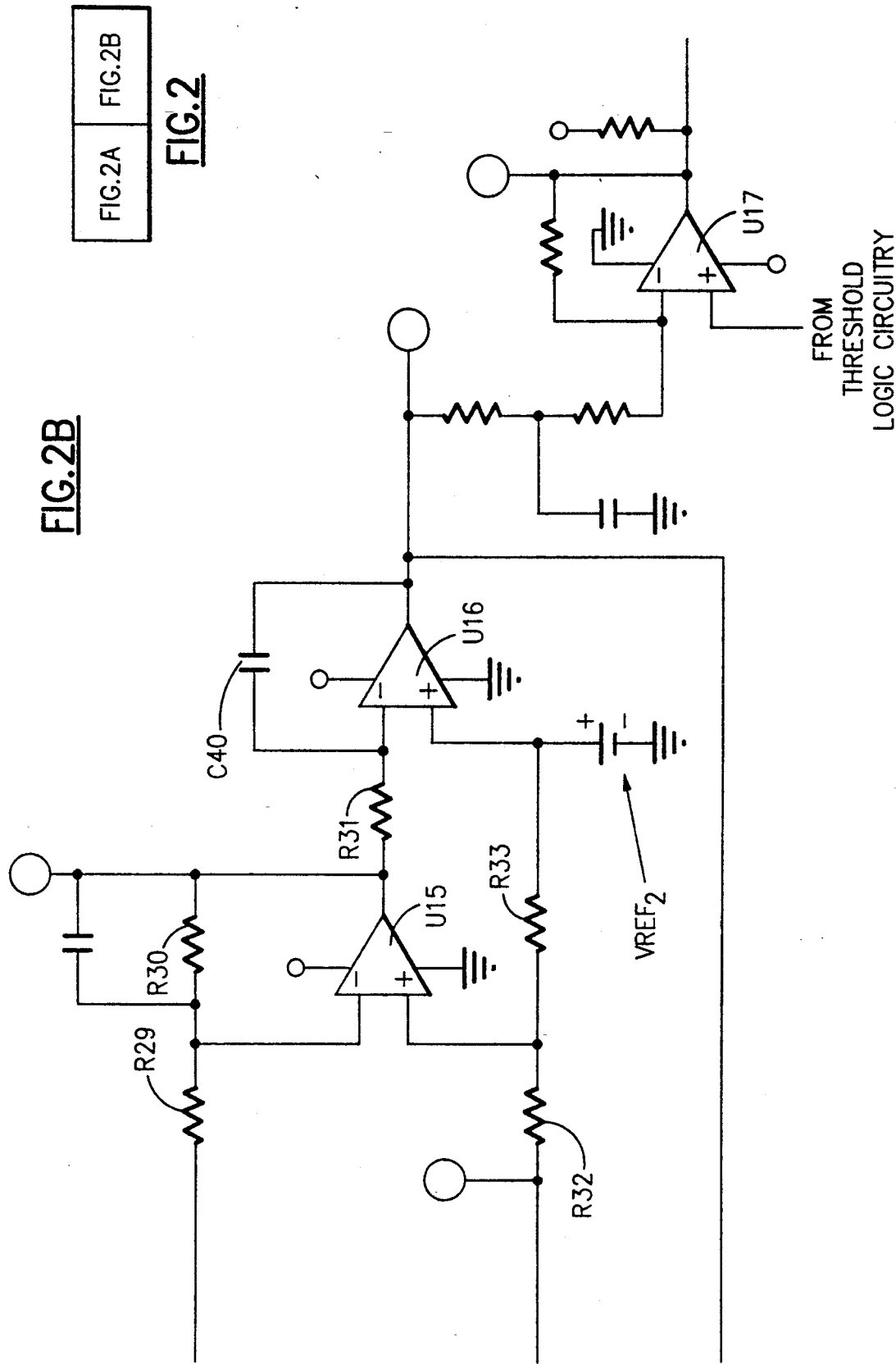

ANALOG RECONSTRUCTION CIRCUIT AND BAR CODE READING APPARATUS EMPLOYING SAME

BACKGROUND OF THE INVENTION

This invention relates generally to optical code reading devices. It is directed to a circuit that enables a signal to be reconstructed from sparsely sampled analog data, and more specifically to a circuit employed in conjunction with a bar code scanner that allows the transition points between bars and spaces to be identified.

In bar code reading equipment it is essential to accurately identify those areas that are presented as optical elements (bars and spaces) as the bar code symbol is scanned or read. This is particularly true in the case of commonly used codes, both linear and stacked linear, where information is not only found in the presence of bars and spaces, but also in their relative width dimensions. Bar code recognition circuitry conventionally converts an analog signal that is generated by a photodetector to a bit serial binary representation of the bar-space pattern. Conventionally the process of determining the transition points is performed by the digitizer.

In practice, detecting the location of a transition point is often complicated by noise. Such noise can arise from diverse sources such as varying ambient light, physical impediments to the path of light to and from the bar code symbol such as dirt, defocusing, fading or irregularities in the print, microphonics within the scanner, and optical degradation caused by the well known diffusion and laminate effects. Other sources of noise and error are known in the bar code reading art.

Conventionally a time sampled scanning bar code scanner (reader) performs a relatively sparse temporal sampling of a bar code symbol being scanned, while a CCD bar code scanner performs, analogously, a relatively sparse spatial sampling of a bar code symbol being scanned. The information density realized by a scan is a function of the modulation transfer function of the optical system, the physical size of the symbol and, depending upon the type of device, the scanning rate or the granularity of the photodetectors. The temporal or spatial samples are presented to signal processing circuitry as a sequence of amplitude levels having maxima and minima. Typically the transition point is defined as being intermediate the maxima and minima which are indicative of light and dark areas on the bar code symbol. It will be evident that a transition point generally will not occur precisely at a sampled point, but will lie between samples. Failure to take this fact into account can result in significant inaccuracy in determining the transition point, in determining the relative width of the space or bar, and in the interpretation of the bar code symbol. These problems, are further exacerbated by the aforementioned noise factors.

In U.S. Pat. No. 3,909,594 to Allais et al., there is shown a circuit that establishes a variable reference voltage, allowing the reader to compensate for variations in the amplitude of the photodetector signal caused by noise. The reference voltage is utilized by a comparator to identify the presence of a bar or a space.

In the disclosure of U.S. Pat. No. 4,335,301, to Palmer et al, two positive and negative peak detecting circuits define a varying reference voltage having a value that is intermediate to positive and negative peak voltages and can be used to identify a transition between bars and spaces. This circuit is able to compensate for reflectance variations among successive bars or spaces.

U.S. Pat. No. 4,833,309 to Yomogida discloses a peak hold circuit for converting an analog signal from a bar code detector into a digital signal. Reference signals corresponding to peaks are compared with an incoming signal in order to determine a transition. Compensating adjustments in the levels of the reference signals can be effected, tending to reduce the influence of noise on detection of transitions between bars and spaces.

While the above circuits are useful in defining the signal level that corresponds to a space-bar or bar-space transition, they do not address the problem of accurately locating the point in time or position at which a sparsely sampled analog signal crosses the defined level.

SUMMARY OF THE INVENTION

It is therefore a primary object of the present invention to accurately determine the transition points of a temporally sparsely sampled analog signal representation of a bar code symbol.

It is another object of the present invention to accurately determine the transition points of a spatially sparsely sampled analog signal representation of a bar code symbol.

It is still another object of the present invention to provide an improved hardware implementation for a bar code digitizer.

It is another object of the present invention to accurately identify the transition points between bars and spaces in a bar code symbol.

These and other objects of the present invention are attained by accepting as input the analog signals from a bar code scanner, and producing a digitizer output in which a bar code symbol is represented as a bit serial binary signal.

The analog output signal of a sampled bar code scanner is a discretized signal that corresponds to the temporally or spatially sampled bar code symbol. The amplitude of a particular quantum of the analog signal corresponds to the amount of light reflected from a relatively small region on the symbol that is viewed by a bar code scanner. It is helpful in understanding the invention to refer to FIG. 3, wherein there is shown diagrammatically a bar code symbol 30 comprising dark bars 32a, 32b, separated by white spaces 31a, 31b. Signal 34 (shown as segments 34a-34f and continuing) is a step function representation of the analog signal 33, which is a convolution of the target reflectivity function and the optics transfer function. Step function 34 is broken down into the individual steps 34a-34f, and represents a fragment of the analog signal produced during the scanning of a bar code symbol and then being sparsely temporally sampled as might be done with hold circuits or by an analog-to-digital converter, or being sparsely spatially sampled by a CCD array. Line 39 corresponds to the value of the convolved reflectance function at a particular space-bar transition 37. In the preferred embodiment the reference threshold is an estimator of the value of the analog signal at a transition point and is derived from observed reflectance characteristics of bars and spaces in the bar code symbol. Reflectance information is accumulated as the symbol is scanned, and is used to repeatedly update the reference threshold. Local maxima and minima in the analog samples, representing reflectances of bars and spaces, are used in the preferred embodiment to determine this reference threshold; however it could be determined using other values that can be derived from the sampled analog data, such as average reflectance values associated with bars and spaces, or even a constant.

Samples (indicated by the series of contiguous rectangles in FIG. 3) of the analog signal, taken at times or positions corresponding to boundary points 35a and 35b, would indicate the existence of the edges of signal 34c. The error in assigning the edge 37 of bar 32a would be the widths 39a or 39b respectively, and a transition in the worst case could have an error approaching the width of signal 34c. Since each bar or space has two edges, the cumulative error in determining the width could be even greater.

Study of convolved reflectance functions in bar code scanners, exemplified by analog signal 33, has revealed that the second derivative is small or zero in the region corresponding to transitions such as transition 37. As function 33 is nearly linear in the region of the transition (shown as region 41), it can be closely approximated by linear reconstruction using sampled outputs 35a, 35b, which define the heights of rectangles 34c and 34d, respectively and indicate the magnitudes of the two consecutive samples, the reconstruction being shown as line 38. Offset 39a can then be readily determined by linear interpolation. While linear interpolation is utilized in the preferred embodiment, it will be appreciated by those skilled in the art that nonlinear interpolation, or even a form of extrapolation, could be employed without departing from the spirit of the invention.

In a preferred embodiment of the invention, utilizing a CCD array, samples of an analog signal, such as 34a–34f, are associated pairwise, stored in sample-and-hold circuits, and presented to a difference amplifier. The output of the difference amplifier is fed to an integrator having a time constant substantially equal to the reciprocal of the transfer rate of the CCD array, which is equal to the time period between successive samples as they are presented by the CCD array. The output of the integrator is a linear time-varying signal corresponding to line 38, and is presented to a conventional comparator. It should be noted that in actuality the output of the integrator replicates the incoming analog signal delayed by one time period between successive samples; however for reasons of clarity this delay has not been shown. After a period of time which is equal to the integrator time constant, the integrator output becomes substantially equal to the signal representing the last sample of the CCD array output signal. This fact can be exploited by coupling the output of the integrator to sample-and-hold circuitry, clocking in a new sample of the CCD output signal, and thereby associating the values of two successive samples of the CCD output signal Successive introduction in this manner of CCD output samples to the sample-and-hold circuits allows the difference amplifier and integrator to iterate as successive CCD output signals become available. It will now be evident that the output of the integrator over multiple iterations is a continuous piece-wise linear reconstruction of the convolved reflectance function 33 as discussed above.

Whenever the amplitude of the integrator output crosses the reference threshold level, the comparator output switches from a first to a second logical level, indicating that a transition between a region of low reflectance and a region of high reflectance (or vice versa) has occurred.

Thus, the intervals between successive first and second logical signal outputs accurately reflect the relative widths of spaces and bars in the bar code symbol that is being scanned. Although the preferred embodiment transforms the original bar-space width representation in the bar code symbol to a bit serial binary representation, it is possible to produce other forms of output, such as a digital word, representing the elapsed system time when the output was asserted. Another output would be the value of a counter that measures the elapsed time since a previous output transition was asserted. Such output forms may be advantageous when the digitizer is integrated with further decoding means.

BRIEF DESCRIPTION OF THE DRAWINGS

For a better understanding of these and other objects of the present invention, reference is made to the detailed description of the invention which is to be read in conjunction with the following drawings, wherein:

FIG. 2 is a diagram indicating the relationships of FIGS. 2A and 2B;

FIGS. 2A and 2B are detailed schematics of the preferred embodiment of the invention;

DETAILED DESCRIPTION OF THE INVENTION

The invention is explained herein with reference to a bar code scanner, it being understood that the circuitry that is disclosed can be used in other applications where it is desired to reconstruct an analog signal from sampled data.

Figure 1:
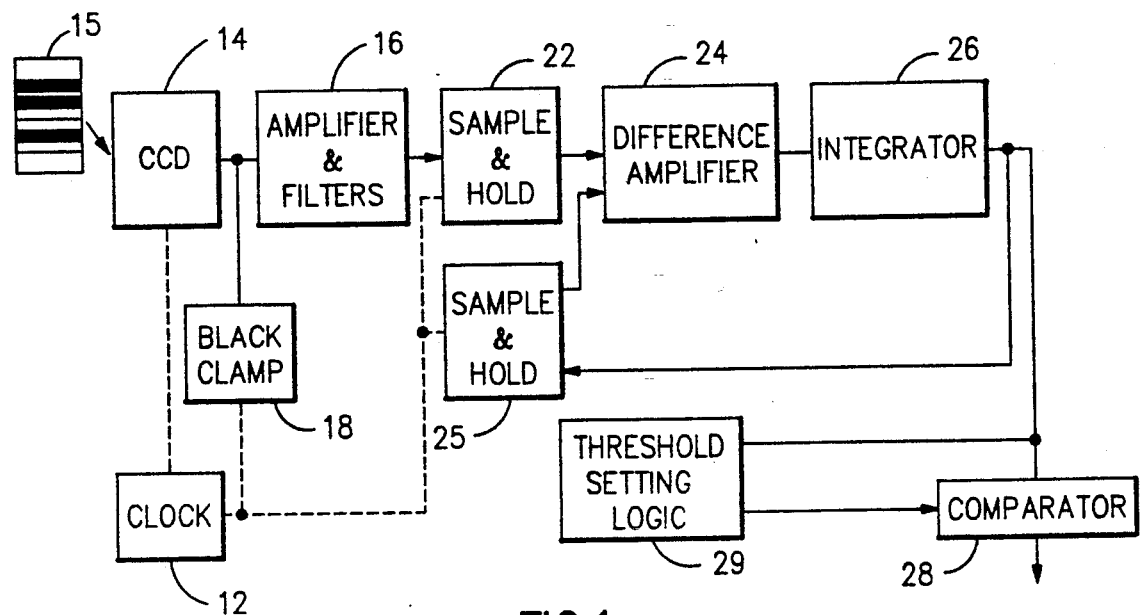
FIG. 1 is a block diagram of the preferred embodiment of the invention.
Figure 4:
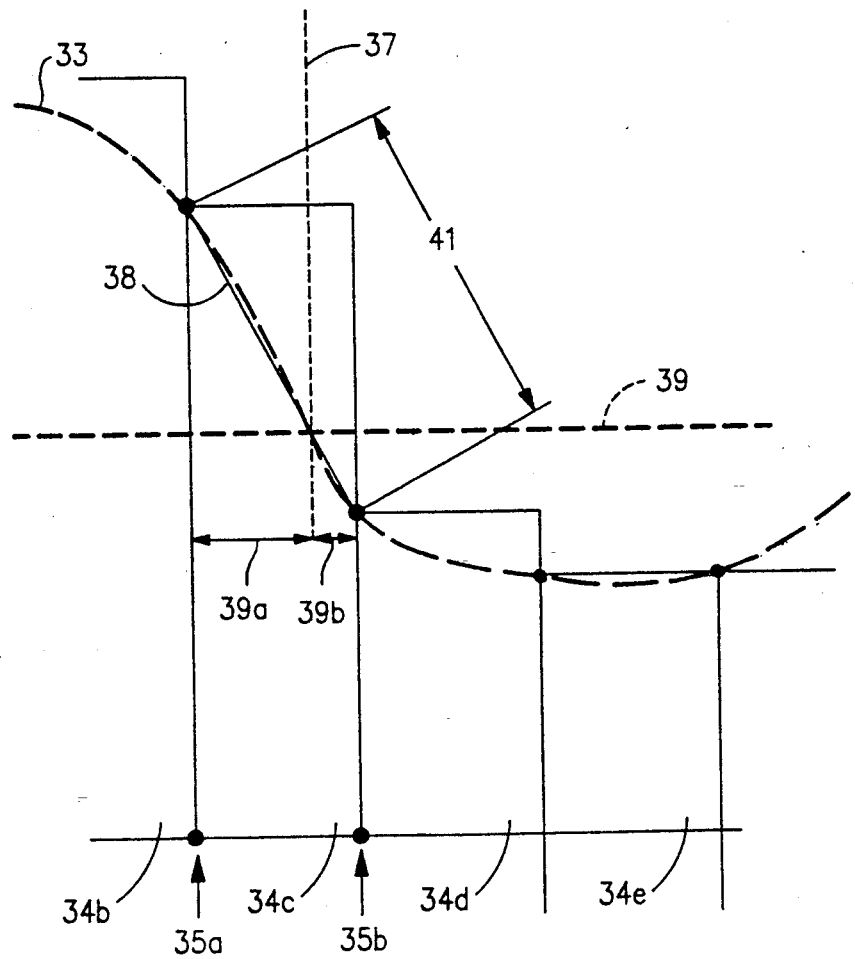
FIG. 4 is an enlargement of a portion of FIG. 3.

Turning now to the drawings, and in particular to FIG. 1, there is shown a block diagram of an embodiment of the instant invention. A conventional photosensor 14, or photosensor and light source combination (not shown), in a bar code scanner produces analog signals in response to light reflected from a bar code symbol, which, when sampled, represent the optical reflectance pattern of the bar code symbol being scanned. This embodiment may be contained in a single housing. An image of a bar code symbol 15 is detected by photosensor 14, which is preferably a multi-element CCD array. The invention has been tested with the UPD35H73, available from NEC, which has a 2048 bit photosensor array. The operation of CCD 14 and the analog processing circuitry shown in FIG. 1 is regulated by clock 12.

The black level of the CCD output is synchronously clamped to a reference level by black clamp circuit 18 at the beginning of every scan cycle.

Amplifier block 16 is implemented by two cascaded operational amplifiers. Because these amplifiers have high input impedance, they facilitate the insertion of switched low pass filter sections therebetween. However they may be omitted if low pass filtering is deemed to be unnecessary. Low pass filters are often desirable when scanning dot matrix bar code symbols.

In order to determine the slope between two consecutive elements of the discretized analog signal, a present signal amplitude, corresponding to the signal output of a current CCD element, is gated by clock 12 from amplifiers 16 and appears at the output of sample-and-hold circuit 22. Simultaneously, a previous signal amplitude, corresponding to the signal output of the immediately preceding CCD element, as will be described below, is gated by clock 12 from the integrator output 26 and appears at the output of sample-and-hold circuit 25. The outputs of sample-and-hold circuit 22 and 25 are each presented to an input of difference amplifier 24. The output of the difference amplifier is proportional to the difference between the signal output amplitudes of the present CCD element and the previous CCD element, as the elemental outputs are transferred through the shift register of the CCD array. The output of the difference amplifier 24 is presented to the integrator 26.

Figure 3:
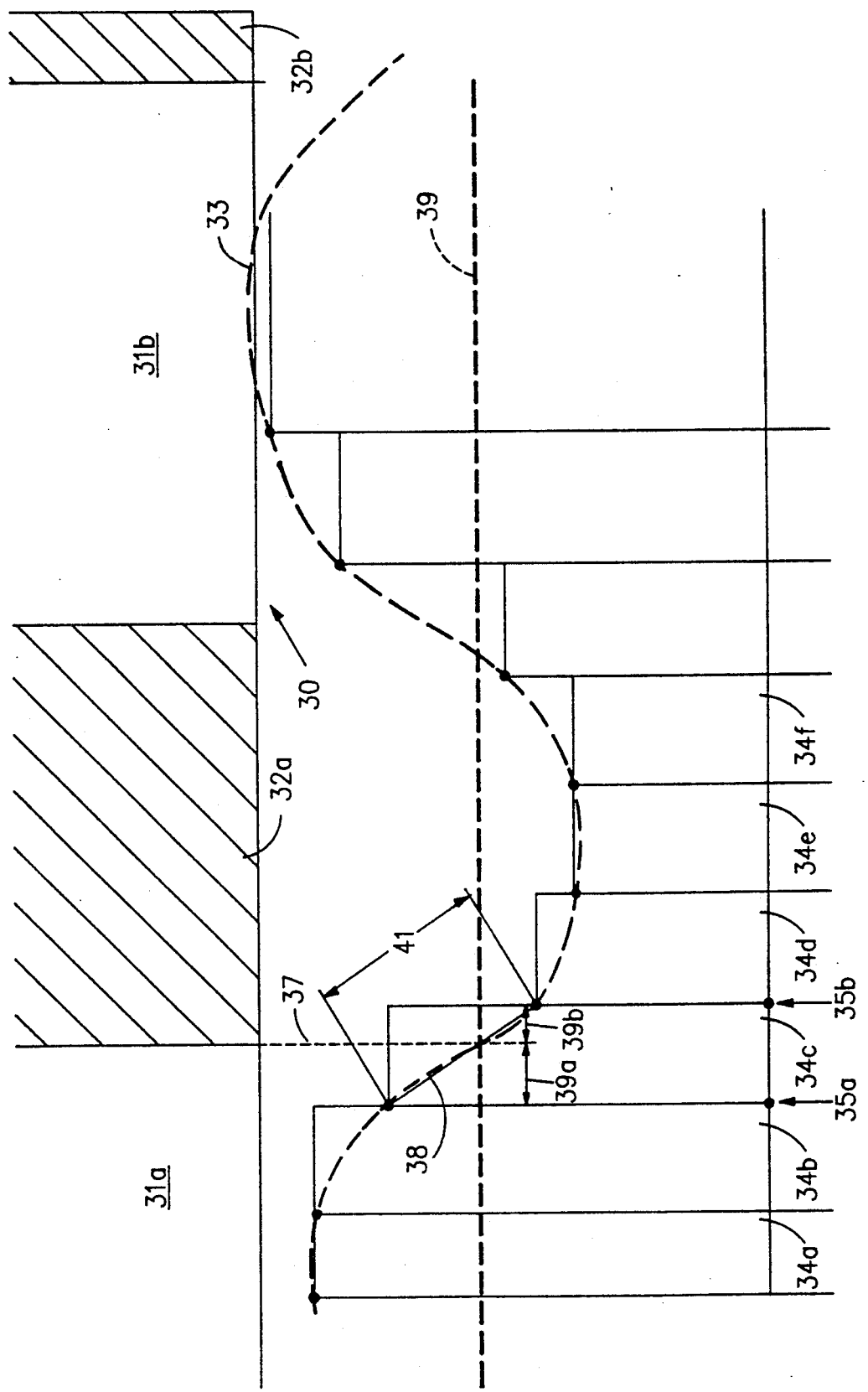
FIG. 3 is a waveform diagram that is helpful in understanding the invention.

Integrator 26 begins to integrate the output of difference amplifier 24. The integrator output, exemplified by line 38 in FIG. 3, is a continuous piece-wise linear approximation of an analog signal that would represent the continuous reflectance function of the bar code symbol as convolved with the optics transfer function, exemplified as curve 33. Again, for clarity the integrator output is shown without delay However a nonlinear system element rather than an integrator may be desirable under some circumstances. Due to the observation that the second derivative of the analog signal 33 is small or zero in the region corresponding to transitions such as transition 37 it is known that signal 33 is nearly linear in the region of the transition (shown as region 41). Thus, it can be closely approximated by linear reconstruction between outputs 34c and 34d, shown as line 38. Offset 39a is effectively determined by linear interpolation as performed in conjunction with comparator 28.

When the time constant of integrator 26 is chosen as the reciprocal of the CCD transfer rate, the signal output by the integrator will be substantially equal to a desired value at the end of an interval corresponding to the time period between successive signals from the CCD array. In the preferred embodiment, it will be substantially equal to the value of the voltage previously stored in sample-and-hold circuit 22. Simultaneously, a new signal will have been similarly gated into sample-and-hold circuit 22 from amplifier 16. Circuits 22 and 25 now contain voltages that correspond to successive elemental amplitudes of the CCD array, and these voltages appear at the inputs of difference amplifier 24. The integrator is then ready to iterate the above described cycle. Under certain circumstances it may be desirable to have an integrator time constant either greater or less than the reciprocal of the CCD transfer rate in order to achieve a desired filtering function.

Comparator 28 has one input coupled to the reference threshold voltage, shown in FIG. 1 as threshold setting logic circuitry 29. A number of methods for deriving the reference threshold voltage, including those disclosed in the above referenced patents, are known to the art and they will not be further discussed herein. The comparator has a first logical output when the integrator output amplitude exceeds the reference voltage, and has a second logical output when the integrator output amplitude does not exceed the reference voltage.

Figure 2A:
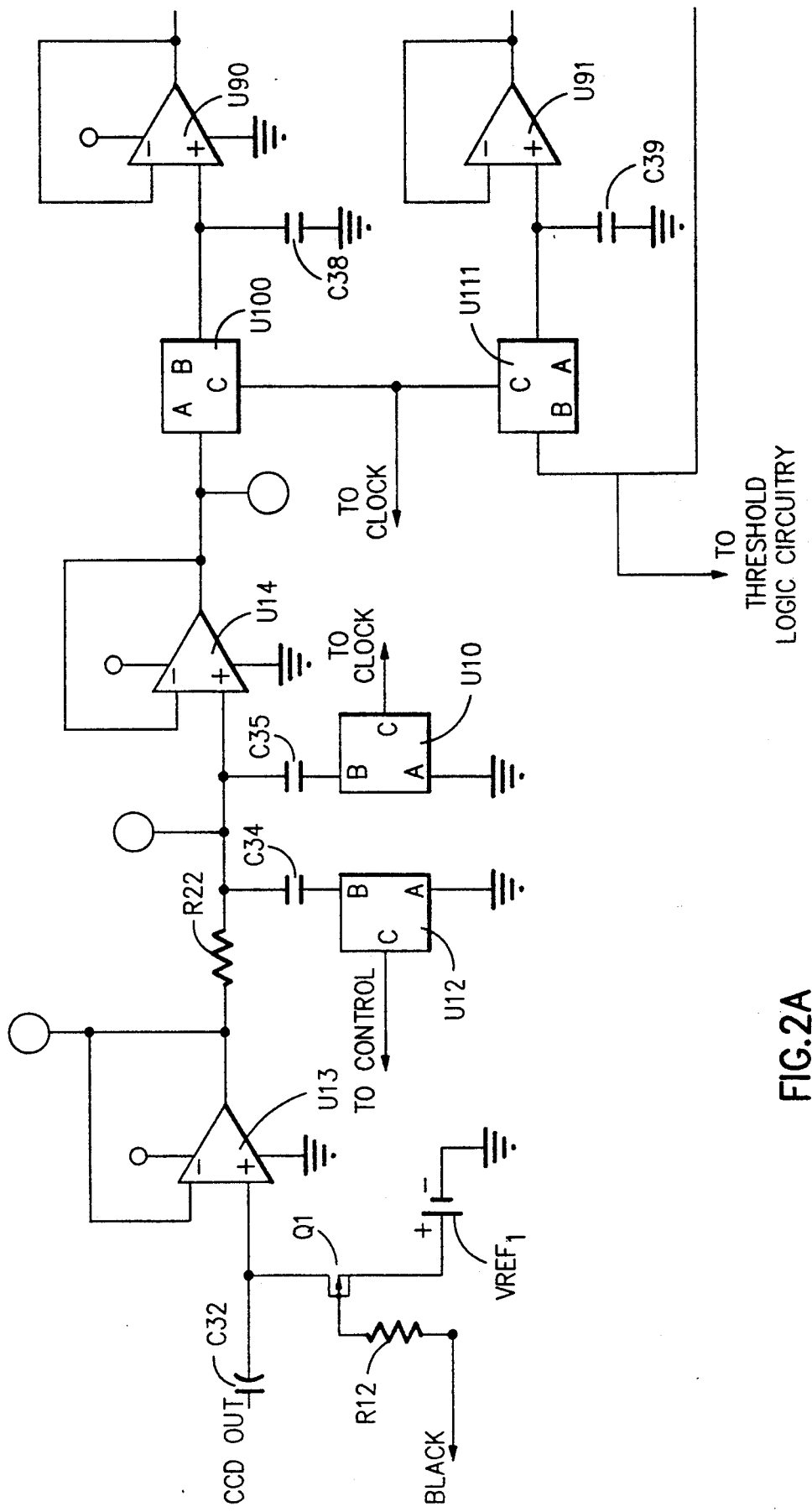

Referring now to FIG. 2, there is shown a detailed schematic of the preferred embodiment of the invention. The CCD output is coupled through capacitor C32 to the noninverting input of operational amplifier U13. A UPD35H73 CCD array produces an output signal having an nominal amplitude of approximately 200 mV peak-to-peak when the illumination levels are appropriately controlled. The output is black high with an offset level of 5 to 9 volts.

It is convenient to operate the signal processing circuitry from a +5 V supply, so that a negative power supply is not required. This requires that the CCD output signal be shifted down to VREF1, approximately 1.5 V. FET switch Q1 is closed by the presence of a BLACK signal, connected to the gate of the FET through current limiting resistor R12, thereby clamping one side of C32 to VREF1.

The output of operational amplifier U13 is coupled through resistor R22 to the noninverting input of operational amplifier U14. Two low pass filter sections, realized by resistor R22 and capacitors C34 and/or C35, can be interposed between operational amplifiers U13 and U14 by closing semiconductor switches U12 and U10 respectively, the switches being controlled by any suitable control means.

Momentarily closing semiconductor switch U100 by a clock pulse causes the output of U14, representing the transferred charge of a particular element of the CCD array 14, to appear on sample-and-hold capacitor C38, and also on the noninverting input of sample-and-hold buffer U90, a FET input operational amplifier with unity gain.

Figure 5:
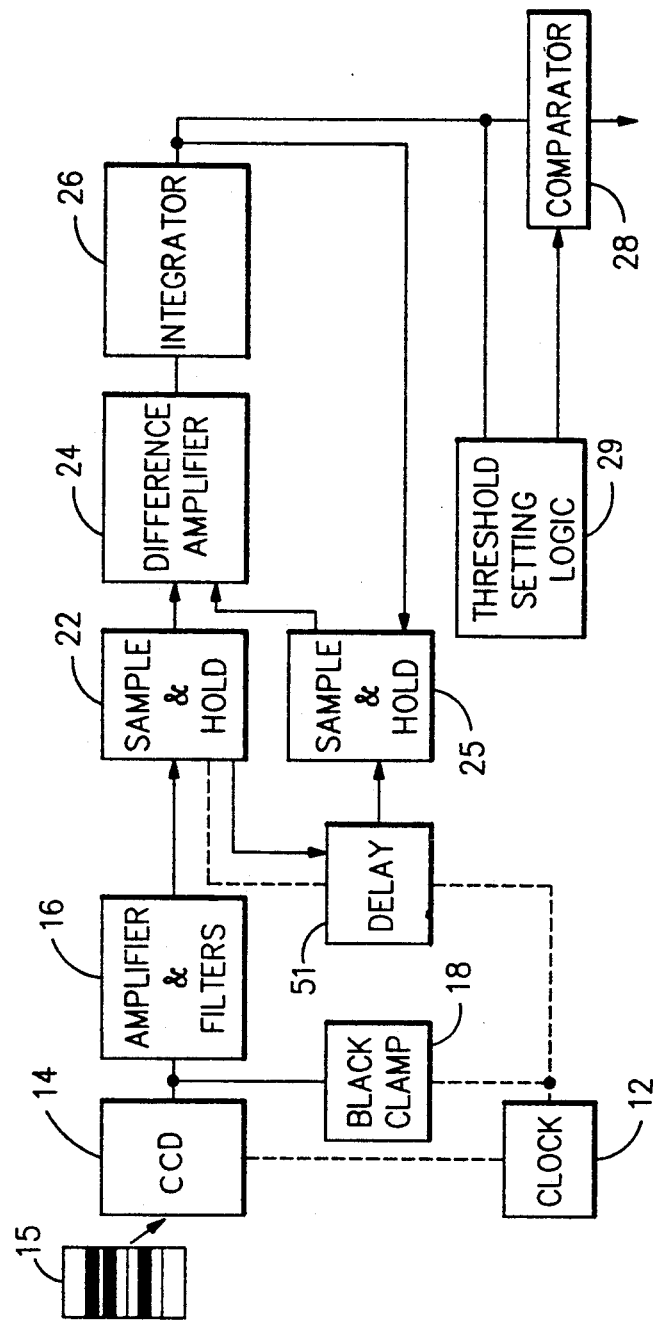
FIG. 5 is a block diagram of an alternate embodiment of the invention.

Semiconductor switch U111 closes simultaneously with U100, and the output of U16 is fed back to sample-and-hold capacitor C39 and the noninverting input of operational amplifier U91. As explained above, immediately prior to the time that U111 is closed, the output of the integrator is substantially equal to the voltage across C38. It is possible to memorize the voltage across C38 with an additional sample-and-hold circuit, or to include conventional delay circuitry (indicated by reference numeral 51 in FIG. 5) to transfer the voltage stored in C38 to C39. However utilizing closed loop feedback from the integrator output lessens the tendency for the integrator to drift, and in general achieves more stable, partially self-correcting integrator operation. In this way the value of a present amplitude is assigned to a previous amplitude for the suceeding iteration of the integrator.

Sample-and-hold amplifiers U90 and U91 are coupled, through resistors R29 and R32 to the inputs of operational amplifier U15, which is configured as a difference amplifier. The sample and hold circuits assure that the output of U15, and hence the starting point and slope of the integrator 26, are constant during an interval of integration. Integrator 26 is realized using operational amplifier U16, and resistor R31, and capacitor C40. A biasing voltage VREF2 assures stable operation of the integrator.

The inputs of comparator U17 are coupled to the output of U16, and to the reference threshold voltage as discussed above. The output of U17 is led to further processing circuitry or to a display.

In operation the above described circuit is incorporated into a bar code scanner having conventional optics and processing circuitry that accepts the output of comparator 28. The technique for constructing the remainder of the bar code scanner system are well known to those skilled in the art, and need not be further discussed herein.

While this invention has been explained with reference to the structure disclosed herein, it is not confined to the details set forth and this application is intended to cover any modifications and changes as may come within the scope of the following claims.

What is claimed is:

1. A reconstruction circuit that accepts as input a sampled analog signal and produces a continuous piece-wise output signal, comprising:
   input means for periodically accepting samples of said analog signal;
   first storage means, coupled to said input means, for holding a first sample, said first sample being taken from said analog signal;
   second storage means for holding a second sample;
   difference amplifier means, coupled to said first and said second storage means, having an output that is responsive to the difference of the amplitudes of said first sample and said second sample;
   integrator means for producing an output signal that changes at a rate that is responsive to said difference amplifier means; and
   feedback means coupled to said integrator means and said second storage means for bringing the amplitude of the signal that is stored in said second storage means substantially to the amplitude of said first sample in said first storage means when said first storage means is ready to accept a sample from said input means.

2. The circuit of claim 1, further comprising comparator means, coupled to said integrator means, for producing an output at a first logic level when the signal produced by said integrator means exceeds a given amplitude, and for producing a signal output at a second logic level when the signal produced by said integrator means does not exceed said amplitude.

3. The circuit of claim 1, wherein said integrator means produces a signal that changes at a rate that is related to said output of said difference amplifier means by a multiplicative proportionality constant.

4. The circuit of claim 3, wherein said proportionality constant is substantially equal to said period at which said input means accepts samples.

5. The circuit of claim 1, wherein said input means comprises:
   a capacitor, coupled to said analog signal;
   clamping means for establishing a black reference voltage; and
   an amplitude for adjusting said analog signal to a suitable voltage level.

6. The circuit of claim 1, wherein
   said first and second storage means each comprises a sample-and-hold circuit having a switch, a holding capacitor, and an amplifier; and
   said difference amplifier means comprises an operational amplifier having an inverting input coupled to one of said sample-and-hold amplifiers and a noninverting input coupled to the other of said sample-and-hold amplifiers.

7. A bar code scanner, comprising:
   a plurality of CCD elements that detect light images from a bar code symbol and provide analog signals in response thereto, said analog signals being indicative of the bar-space pattern of said bar code symbol;
   means for directing light that is reflected from the bar code symbol to said CCD elements;
   a reconstructing circuit, coupled to said CCD elements that accepts as input a sequence of analog signals and produces a continuous piece-wise linear first output signal, comprising:
      input means for periodically accepting samples from said analog signals;
      first storage means, coupled to said input means, for holding a first sample of said analog signal;
      second storage means for holding a second sample of said analog signal;
      difference amplifier means, coupled to said first and second storage means, having an output that is responsive to the difference of the amplitudes of said first sample and said second sample;
      integrator means for producing a first output signal, said first output signal changing at a rate that is responsive to said difference amplifier means; and
      feedback means coupled to said integrator means and said second storage means for bringing the amplitude of the signal that is stored in said second storage means substantially to the amplitude of said first storage means when said first storage means is ready to accept a sample from said input means; and
   comparator means, coupled to said first output signal, for producing a second output signal, said second output signal being at a first logic level when said first output signal exceeds a given amplitude, and being at a second logic level when said first output signal does not exceed said amplitude.

8. The circuit of claim 7, wherein said integrator means produces a signal that changes at a rate that is related to said output of said difference amplifiers means by a multiplicative proportionality constant.

9. The circuit of claim 8, wherein said proportionality constant is substantially equal to said period at which said input means accepts samples.

10. The scanner of claim 7, further comprising an input circuit, said input circuit comprising:
    a capacitor, coupled to said CCD elements;
    clamping means for establishing a black reference voltage; and
    an amplifier for adjusting said analog signals of said CCD elements to a suitable voltage level.

11. The scanner of claim 7, wherein
    said first and second storage means each comprises a sample-and-hold circuit having a switch, a holding capacitor, and an amplifier; and
    said difference amplifier means comprises an operational amplifier having an inverting input coupled to one of said sample-and-hold amplifiers and a noninverting input coupled to the other of said sample-and-hold amplifiers.

* * * * *